United States Patent
Ibison

(10) Patent No.: US 9,509,489 B1
(45) Date of Patent: Nov. 29, 2016

(54) CORRECTION OF QUADRATURE MODULATION ERRORS

(71) Applicant: Altiostar Networks, Inc., Tewksbury, MA (US)

(72) Inventor: John N. Ibison, Bradford (GB)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 14/822,813

(22) Filed: Aug. 10, 2015

(51) Int. Cl.
| | |
|---|---|
| H04L 27/36 | (2006.01) |
| H04L 7/033 | (2006.01) |
| H04L 7/00 | (2006.01) |
| H04L 27/20 | (2006.01) |

(52) U.S. Cl.
CPC ........... *H04L 7/0331* (2013.01); *H04L 7/0087* (2013.01); *H04L 27/206* (2013.01); *H04L 27/364* (2013.01)

(58) Field of Classification Search
CPC . H04L 7/0331; H04L 7/0087; H04L 27/206; H04L 27/364
See application file for complete search history.

(56) References Cited

U.S. PATENT DOCUMENTS

| | | | | |
|---|---|---|---|---|
| 5,900,778 A * | 5/1999 | Stonick | ................. | H03F 1/3247 330/149 |
| 8,045,642 B2 * | 10/2011 | Rexberg | ................ | H03F 1/3247 330/149 |
| 8,068,557 B2 * | 11/2011 | Dalipi | .................. | H03F 1/3247 330/149 |
| 8,934,588 B2 * | 1/2015 | Yu | ......................... | H04L 27/364 375/316 |
| 9,088,472 B1 * | 7/2015 | Jain | ....................... | H04L 27/368 |
| 9,106,304 B2 * | 8/2015 | Row | .................... | H04B 1/1638 |
| 2002/0024398 A1 * | 2/2002 | Lagerblom | ......... | H04L 27/2071 332/103 |
| 2004/0121741 A1 * | 6/2004 | Rashev | ................. | H03F 1/3211 455/114.3 |
| 2005/0069050 A1 * | 3/2005 | Ding | ........................ | H03C 3/40 375/296 |
| 2009/0074105 A1 * | 3/2009 | Mege | ..................... | H04L 27/364 375/296 |
| 2011/0228826 A1 * | 9/2011 | Yokoo | ................. | H04L 27/0014 375/219 |
| 2012/0300818 A1 * | 11/2012 | Metreaud | ................. | H04B 1/30 375/219 |

\* cited by examiner

*Primary Examiner* — Kenneth Lam
(74) *Attorney, Agent, or Firm* — Mintz Levin Cohn Ferris Glovsky and Popeo, P.C.

(57) ABSTRACT

In one aspect a computer-implemented method is performed. The method may include capturing intermediate data samples for transmission by a wireless communications transmitter. The method may further include applying signal processing to the intermediate data samples, capturing output data samples after applying the signal processing, and/or determining quadrature correction coefficients from the intermediate data samples and the output data samples, wherein the quadrature correction coefficients remove quadrature errors caused by the signal processing. The method may further include applying the quadrature correction coefficients to a series of input data samples, wherein the intermediate data samples comprise the input data samples with the quadrature correction coefficients applied to the input data samples. The capturing the intermediate data samples, the applying the signal processing, the capturing the output data samples, the determining the quadrature correction coefficients, and the applying the quadrature correction coefficients may be performed by at least one processor.

22 Claims, 5 Drawing Sheets

CORRECTION OF QUADRATURE MODULATION ERRORS

TECHNICAL FIELD

This subject matter disclosed herein generally relates to the transmission of digital data signals, and in particular, to the removal of quadrature errors from these signals.

BACKGROUND

Many signals in communications and other fields may be represented or produced by combining one or more in-phase components with one or more quadrature components. The components may be sinusoidal components. For example, phase modulated signals ("PSK"), quadrature amplitude modulated ("QAM") signals, and orthogonal frequency division multiplexed ("OFDM") signals may be represented by in-phase and quadrature components. Information may be added to a carrier by modulating a carrier in QAM, PSK, or OFDM according to the information. Errors in amplitudes, phase offsets, and/or frequency offsets to the I and/or Q components may cause signal degradation and performance degradation.

SUMMARY

In one aspect a computer-implemented method is performed. The method may include capturing intermediate data samples for transmission by a wireless communications transmitter. The method may further include applying signal processing to the intermediate data samples, capturing output data samples after applying the signal processing, and/or determining quadrature correction coefficients from the intermediate data samples and the output data samples, wherein the quadrature correction coefficients remove quadrature errors caused by the signal processing. The method may further include applying the quadrature correction coefficients to a series of input data samples, wherein the intermediate data samples comprise the input data samples with the quadrature correction coefficients applied to the input data samples. The capturing the intermediate data samples, the applying the signal processing, the capturing the output data samples, the determining the quadrature correction coefficients, and the applying the quadrature correction coefficients may be performed by at least one processor.

One or more of the following features can be included in any feasible combination. The signal processing may include amplification. The quadrature correction coefficients may be averaged over time to produce average quadrature correction coefficients. The determining quadrature correction coefficients may include determining matrix values, wherein the matrix values are determined from the intermediate data samples, determining first vector values, wherein the first vector values are determined from the intermediate data samples and the output data samples, and/or determining second vector values representative of the quadrature errors caused by the signal processing. The determining the matrix values may include determining a frequency difference ratio, wherein the values of in the matrix are further determined from the frequency difference ratio. The matrix values are entries in Ho, wherein Ho may be expressed as Equation 42, wherein k is an index having values from a start of the intermediate data samples to an end of the intermediate data samples, and yk are the values of the corresponding intermediate samples. The errors (A0, B0, C0) caused by the signal processing may be expressed as Equation 41, wherein zk are the output samples corresponding to the intermediate samples yk. The quadrature correction coefficients (po, qo, rk) may be expressed as Equation 46, wherein Ko is calculated as Equation 47.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Errors in amplitudes, phase offsets, or frequency offsets to I and/or Q components of a signal may cause signal degradation and performance degradation. Some of the types of errors include: I-Q imbalance where the I and/or Q components are offset by a scaling factor; cross-talk where a portion of the I signal leaks into the Q signal and/or a portion of the Q signal leaks into the I signal; imperfect modulator which may generate an unwanted tone in the output signal.

The subject matter disclosed herein may correct the foregoing types of I-Q errors (also referred to herein as quadrature errors) by calculating statistics derived from captured fragments of input, intermediate, and/or amplified signals. A case where the feedback modulator tone is at 0 Hz is detailed below first followed by the case where the feedback modulator tone is offset from 0 Hz.

In accordance with the subject matter disclosed herein, correction of I-Q errors may be achieved when the feedback modulator tone is at 0 Hz. Moreover, the signals used to estimate the coefficients detailed below are not required to be phase-aligned or of comparable amplitude. Furthermore, the subject matter disclosed herein may take samples of a complex baseband signal, samples of a complex intermediate signal, and/or samples of a complex output signal to: 1) determine statistics of the sampled signals; 2) determine coefficients that may be used to correct the I-Q errors; and 3) correct the I-Q errors on an ongoing basis.

Figure 1:
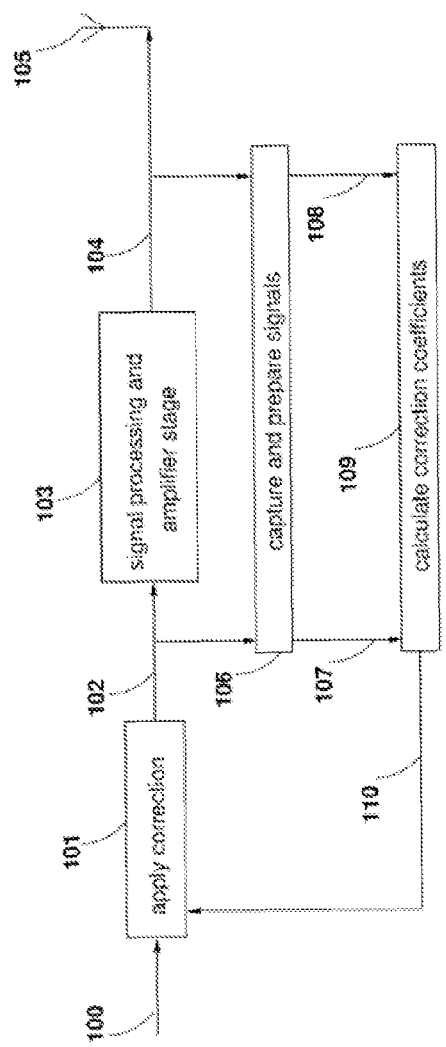
FIG. 1 depicts correction of quadrature modulation errors, according to some example embodiments.

FIG. 1 depicts correction of quadrature modulation errors in a radio transmitter, according to some example embodiments. An input signal 100 enters quadrature correction 101 which generates an intermediate signal 102. At startup, quadrature correction 101 may set the intermediate signal equal to the input signal. Signal processing and amplification 103 operates on intermediate signal 102 to produce output signal 104 which may be transmitted by antenna 105. I-Q errors may occur in signal processing and amplification 103 that may be corrected using the subject matter disclosed herein.

Quadrature correction 101 may apply a set of coefficients 110 to input signal 100 to produce intermediate signal 102. The correction coefficients may adjust the intermediate signal 102 so that the amplified signal 104 has the quadrature errors corrected. The coefficients 110 may be calculated by correction coefficient calculator 109.

Signal preparer 106 may capture samples from both intermediate signal 102 and amplified signal 104, convert both signals to complex IQ format, and align the signals in time. The outputs from signal preparer 106 may be captured signals 107 and 108 which may both be sampled at the same rate, both in complex IQ format, and aligned in time. In some example embodiments, if two signals are sampled at different rates, then one may be converted to match the rate of the other by re-sampling which may involve interpolation of one of the signals by filtering by a finite impulse response ("FIR") filter. In some example embodiments, conversion of a sampled signal to IQ format may be achieved by mixing the signal with a tuning sequence and filtering-out high frequency components. In some example embodiments, time-alignment or shifting a signal in time by a non-integral number of sample points may be accomplished by applying a FIR filter or a Lagrange interpolation filter. In some example embodiments, calculation of the time delay between two signals can be accomplished by finding the point of minimum variance between shifted versions of the signals.

The correction coefficient calculator 109 may calculate a set of coefficients 110 from the time-aligned, complex-valued captured signals 107 and 108 produced by signal preparer 106. The set of coefficients 110 may be stored in quadrature correction 101. Multiple sets of input signals may be used to calculate the correction coefficients which may be averaged to produce more accurate values for the coefficients.

The modulator can introduce an unwanted tone in the transmission spectrum which appears at the modulator local oscillator frequency. To measure this unwanted tone, a portion of the modulated signal is demodulated and sampled using an ADC to create a feedback IQ signal. This feedback signal is then compared with a captured, sampled portion of the outbound signal before it was fed into the modulator. To be comparable, the outbound capture and the feedback capture must be at the same sample rates and must be time-aligned. This may involve the feedback capture being re-sampled. Within the feedback capture, the frequency of this feedback modulator tone depends on the frequency difference of the modulator and demodulator local oscillators as well as the sample frequency of the feedback ADC.

Figure 2:
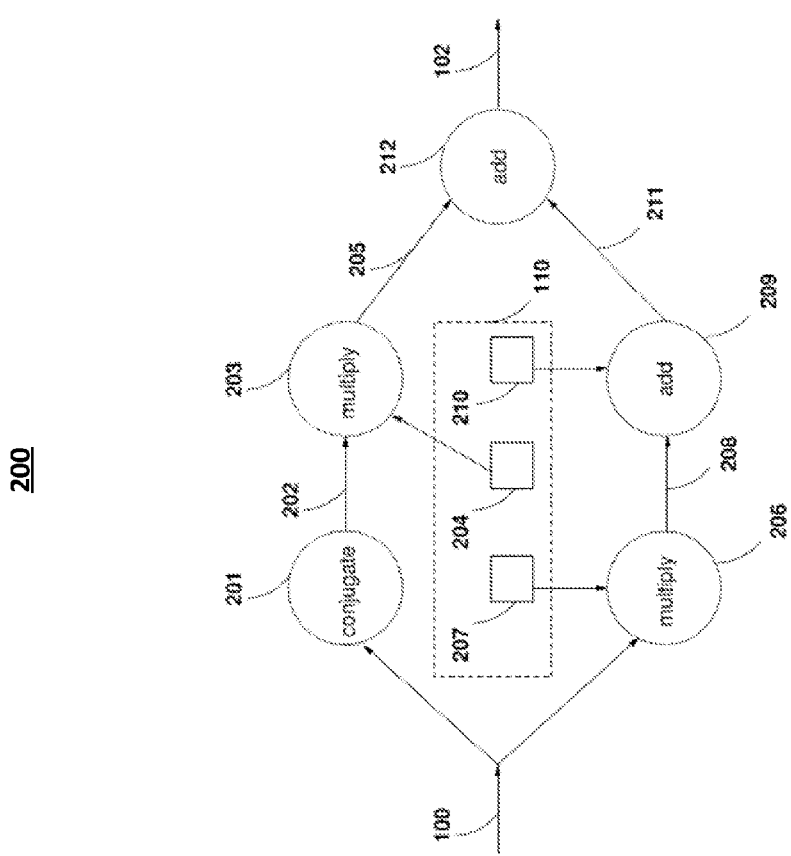
FIG. 2 depicts a process to apply the correction of quadrature modulation errors when the feedback modulator tone may appear at 0 Hz, according to some example embodiments.
Figure 4:
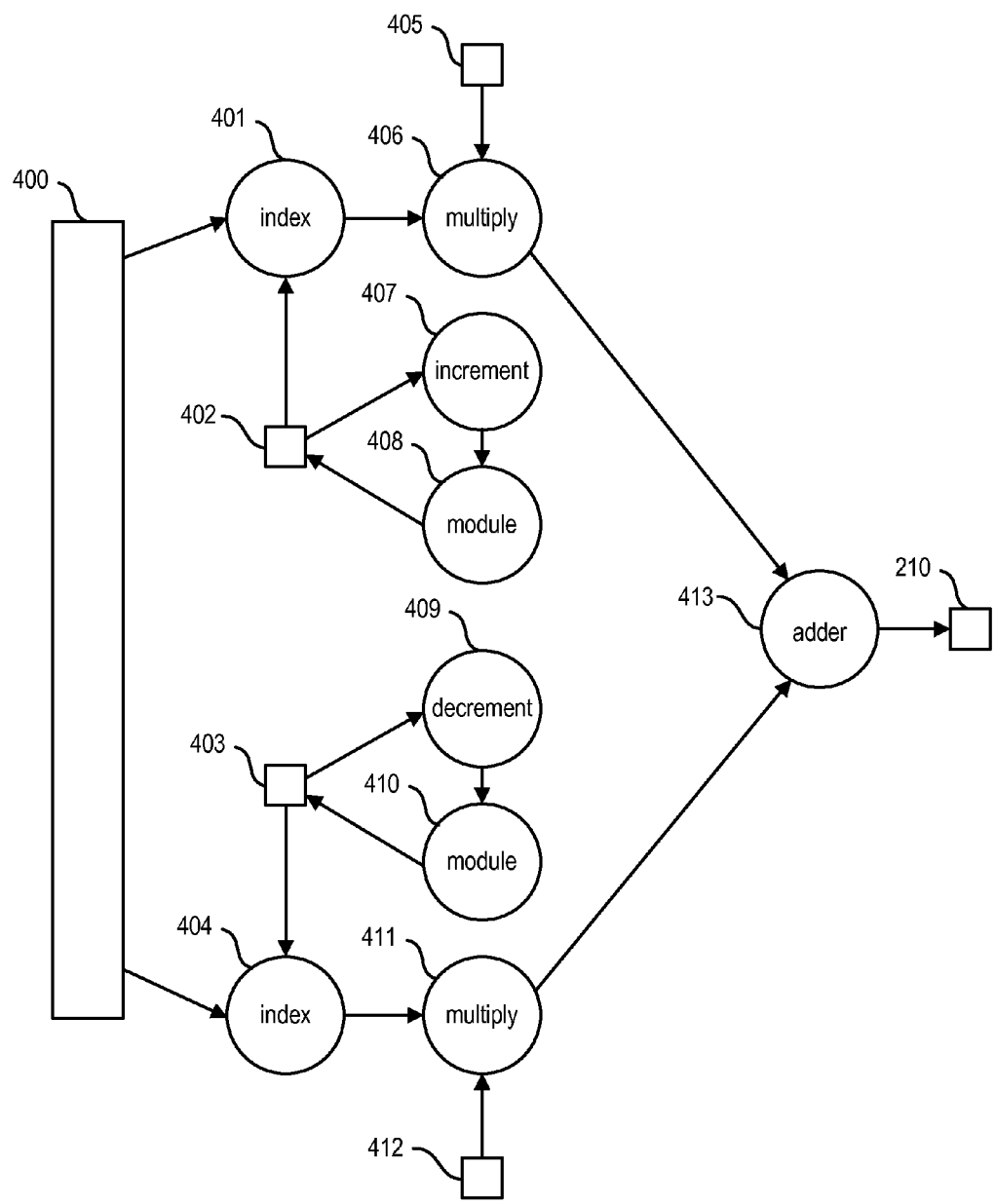
FIG. 4 depicts a process to apply the correction of quadrature modulation errors when the feedback modulator tone appears offset from 0 Hz, according to some example embodiments.

In some example embodiments, FIG. 2 depicts a feedback modulator tone that is a constant term (i.e. at 0 Hz) in the feedback capture and FIG. 4 depicts a feedback modulator tone that is a tone that is offset from 0 Hz.

In some example embodiments, quadrature correction 101 may be further detailed in FIG. 2. FIG. 2 depicts a process to apply the correction to the quadrature modulation errors when the feedback modulator tone appears at 0 Hz, according to some example embodiments. The process of FIG. 2 converts input signal 100 to intermediate signal 102 using complex coefficients 110. The three complex coefficients (207, 204, 210) form the set of coefficients 110.

A sample of input signal 100 may be fed into complex conjugator 201 which forms the complex conjugate 202 of the input sample. The output 202 of complex conjugator 201 may be fed into multiplier 203 which scales 202 by coefficient 204 to give output 205. The sample of input signal 100 may also be fed into multiplier 206 which multiplies the sample by coefficient 207 to produce output 208. 208 may then be fed into adder 209 which may add 210 to produce output 211. Outputs 205 and 211 may be summed by adder 212 to form the sample of intermediate signal 102.

Adders 209 and 212 may perform complex addition, and multipliers 203 and 206 may perform complex multiplication. 207, 204, and 210 may be complex numbers.

$x_k$ may represent the sampled input signal 100 at index k, and $y_k$ may represent the sampled intermediate signal 102. The process depicted in FIG. 2 creates a linear combination according to the equation:

$$y_k = px_k + q\overline{x_k} + r \qquad (1)$$

where the line above a value/variable denotes taking the complex conjugate. For example, the value of $\overline{x_k}$ is the complex conjugate of $x_k$. In some example embodiments p is 207, q is 204 and r is 210.

At start-up, the initial values for p, q, and r may be as follows:

$$p=1, \qquad (2)$$

$$q=0, \qquad (3)$$

$$r=0 \qquad (4)$$

Also at startup, the intermediate signal 102 is set equal to the input signal 100.

In some example embodiments, the gain of quadrature correction 101 is equal to a value of 1. Accordingly, the variance of the intermediate signal 102 is equal to the variance of the input signal 100. Amplification of the intermediate signal 102 is performed at signal processor and amplifier 103.

The expectation value of a variable taking complex values may be expressed as:

$$E[X] = \frac{1}{N}\sum_k x_k \quad (5)$$

The variance of a variable taking complex values may be expressed as:

$$\text{Var}[X] = E[(X-\mu)\overline{(X-\mu)}] \quad (6)$$

where, $\mu = E[X]$.

Quadrature correction 101 may perform the signal mapping given by equation 1, where the unity gain constraint means that:

$$\text{Var}[Y] = \text{Var}[px_k + q\overline{x_k} + r] = \text{Var}[X] \quad (7)$$

Adding a constant value to a random variable does not change the variance, so unity gain may be a restriction on p and q resulting in:

$$\text{Var}[pX + q\overline{X}] = \text{Var}[X] \quad (8)$$

In some example embodiments, the variance of the sum on the left hand side of equation 8 may not equal the sum the variances because X and $\overline{X}$ may not be independent. However, orthogonal frequency division multiplexed signals that include many sub-carriers, such as OFDM in LTE or WiMAX, may be considered to have independent identically distributed real and imaginary parts with variance V. A complex random variable may be expressed as:

$$X = A + iB \quad (9)$$

The variance of X may be expressed as:

$$\text{Var}[X] = \text{Var}[A] + \text{Var}[B] = 2V \quad (10)$$

The variance in equation 8 may then be expressed as:

$$\text{Var}[pX + q\overline{X}] = \text{Var}[p(A+iB) + q(A-iB)] \quad (11)$$

$$= \text{Var}[(p+q)A + i(p-q)B] \quad (12)$$

$$= |p+q|^2\text{Var}[A] + |p-q|^2\text{Var}[B] \quad (13)$$

$$= (|p+q|^2 + |p-q|^2)V \quad (14)$$

$$= \frac{1}{2}(|p+q|^2 + |p-q|^2)\text{Var}[X] \quad (15)$$

$$= \frac{1}{2}((p+q)(\overline{p}+\overline{q}) + (p-q)(\overline{p}-\overline{q}))\text{Var}[X] \quad (16)$$

$$= (|p|^2 + |q|^2)\text{Var}[X] \quad (17)$$

Equation 17 may be equal to the variance in EQN. 11 when X and $\overline{X}$ are independent random variables since, $$\text{Var}[X] = \text{Var}[\overline{X}] \quad (18)$$

The unity gain constraint restricts p and q in equation 1 according to:

$$|p|^2 + |q|^2 = 1 \quad (19)$$

Figure 3:
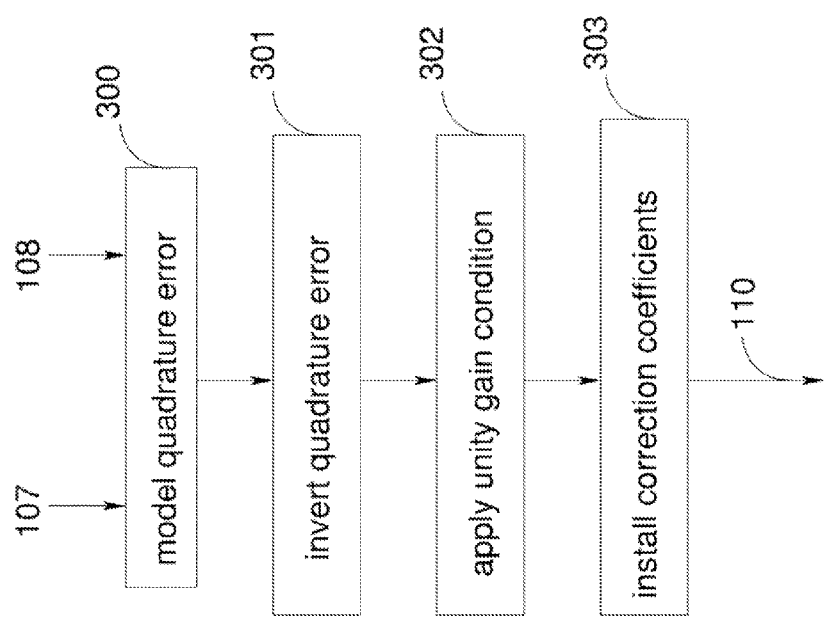
FIG. 3 depicts a process for calculating correction coefficients, according to some example embodiments.

In some example embodiments, correction coefficient calculator 109 may perform a process in accordance with FIG. 3. At 300, the quadrature error introduced by the signal processing and amplifier 103 is determined from the captured output 108. At 300, the quadrature error introduced by the signal processing and amplifier 103 is determined from 107 and 108. In some example embodiments, the quadrature error may be represented by a matrix. At 301, the matrix is inverted. At 302, an unknown factor within the inverted matrix is determined when unity gain is imposed. The correction coefficients 110 are determined from the inverted matrix and the determined factor. At 303, the correction coefficients 110 are stored at quadrature correction 101.

At 300, the quadrature error introduced by the signal processing and amplifier 103 is determined from the captured output 108. At 300, A, B, and C are determined so that the least squares error between the effect of 103 on the intermediate signal 102 and equation 20 below is minimized.

$$z_k = Ay_k + B\overline{y_k} + C \quad (20)$$

The three terms in equation 20 represent: $Ay_k$ is the scaling and phase-shifting of the signal; $B\overline{y_k}$ is the cross-talk; and C is the addition of a feedback modulator tone (at zero Hertz).

Given a pair of time-aligned, complex signal captures $y_k$ (107) and $z_k$ (108), the error function, E, to minimize may be expressed as:

$$E = \sum_k |z_k - Ay_k - B\overline{y_k} - C|^2 \quad (21)$$

Equation 21 can be re-written as:

$$E = \sum_k \{z_k - Ay_k - B\overline{y_k} - C\}\{\overline{z_k} - \overline{A}\,\overline{y_k} - \overline{B}y_k - \overline{C}\} \quad (22)$$

At the point of minimum error, the following partial derivatives vanish:

$$\frac{\partial E}{\partial \overline{A}} = 0 \quad (23)$$

$$\frac{\partial E}{\partial \overline{B}} = 0 \quad (24)$$

$$\frac{\partial E}{\partial \overline{C}} = 0 \quad (25)$$

Evaluating these derivatives applied to equation 22 gives:

$$\begin{pmatrix} \sum_k |y_k|^2 & \sum_k \overline{y_k}^2 & \sum_k \overline{y_k} \\ \sum_k y_k^2 & \sum_k |y_k|^2 & \sum_k y_k \\ \sum_k y_k & \sum_k \overline{y_k} & \sum_k 1 \end{pmatrix} \begin{pmatrix} A \\ B \\ C \end{pmatrix} = \begin{pmatrix} \sum_k z_k \overline{y_k} \\ \sum_k z_k y_k \\ \sum_k z_k \end{pmatrix} \quad (26)$$

This is solved to provide the coefficients (A, B, C) that minimize the least-squares error:

$$\begin{pmatrix} A \\ B \\ C \end{pmatrix} = H^{-1} \begin{pmatrix} \sum_k z_k \overline{y_k} \\ \sum_k z_k y_k \\ \sum_k z_k \end{pmatrix} \quad (27)$$

where the matrix H may be expressed as:

$$H = \begin{pmatrix} \sum_k |y_k|^2 & \sum_k \overline{y_k}^2 & \sum_k \overline{y_k} \\ \sum_k y_k^2 & \sum_k |y_k|^2 & \sum_k y_k \\ \sum_k y_k & \sum_k \overline{y_k} & \sum_k 1 \end{pmatrix} \quad (28)$$

Equations 27 and 28 determine the coefficients to use in equation 20.

At 301, the matrix H is inverted. The following equation:

$$z_k = Ay_k + B\overline{y_k} + C \quad (29)$$

may be rewritten as:

$$y_k = \frac{p}{K}z_k + \frac{q}{K}\overline{z_k} + r \quad (30)$$

where K is a real constant that may be determined by fixing the gain at unity from equation 19

Substitution of equation 30 into equation 29 gives:

$$z_k = \frac{(Ap + B\overline{q})}{K}z_k + \frac{(Aq + B\overline{p})}{K}\overline{z_k} + (Ar + B\overline{r} + C) \quad (31)$$

Comparing coefficients of $z_k$, its conjugate, $\overline{z_k}$, and constant on the right hand side of equation 31 to the left hand side of equation 3, the following may be determined:

$$Ap + B\overline{q} = K \quad (32)$$

$$Aq + B\overline{p} = 0 \quad (33)$$

$$Ar + B\overline{r} + C = 0 \quad (34)$$

Equations 31 and 32 show that K may be the gain of the quadrature corrected system, a real and positive value.

Inversion 301 may solve simultaneous equations 32-34 to express (p, q, r) in terms of (A, B, C, K) as:

$$\begin{pmatrix} p \\ q \\ r \end{pmatrix} = \frac{1}{|A|^2 - |B|^2} \begin{pmatrix} K\overline{A} \\ -KB \\ B\overline{C} - \overline{A}C \end{pmatrix} \quad (35)$$

Imposing the unity gain constraint of equation 19 may determine the value K in equation 35 as:

$$\left(\frac{K}{|A|^2 - |B|^2}\right)^2 (|A|^2 + |B|^2) = 1 \quad (36)$$

Since K is positive and real, K as may be expressed as:

$$K = \frac{||A|^2 - |B|^2|}{\sqrt{|A|^2 + |B|^2}} \quad (37)$$

The values of p, q, and r in equation 35 are now determined. The coefficients given by equation 35 are identified in FIG. 2 as stored values: 207 holds coefficient p, 204 holds coefficient q, and 210 holds coefficient r.

When the local oscillator is at the sampling frequency, correction coefficient calculator 109 calculates the minimum-error values (A, B, C) given by equations 27 and 28 and then calculates the correction coefficients (p, q, r) from equations 35 and 37.

In some example embodiments, when the feedback modulator tone is not at 0 Hz, equation 20 may be replaced by:

$$z_k = A_o y_k + B_o \overline{y_k} + C_o e^{ikd} \quad (38)$$

where d may be related to the local oscillator frequency $f_{lo}$ and the sampling frequency $f_s$ by the following:

$$d \propto \frac{f_{mod} - f_{demod}}{f_s}, \quad (39)$$

where $f_{mod}$ is the modulator local oscillator frequency, $f_{demod}$ is the demodulator local oscillator frequency, and fs if the feedback sample rate.

In this example, the equation implemented by the quadrature correction 101 may be changed from equation 30 to:

$$y_k = \frac{p_o}{K}z_k + \frac{q_o}{K}\overline{z_k} + r_k \quad (40)$$

Correction coefficient calculator 109 may calculate the constants in equation 40.

This is solved in the same way as before; by first finding $(A_o, B_o, C_o)$ and using these plus the unity gain condition of equation 19 to determine the coefficients in equation 40.

Using partial derivatives on the expression of the total error the values of $(A_o, B_o, C_o)$ that minimize the error may be calculated as:

$$\begin{pmatrix} A_o \\ B_o \\ C_o \end{pmatrix} = H_o^{-1} \begin{pmatrix} \sum_k z_k \overline{y_k} \\ \sum_k z_k y_k \\ \sum_k z_k e^{-ikd} \end{pmatrix} \quad (41)$$

where the matrix $H_o$ is defined by EQN. 42 as:

$$H_o = \begin{pmatrix} \sum_k |y_k|^2 & \sum_k \overline{y_k}^2 & \sum_k \overline{y_k} \\ \sum_k y_k^2 & \sum_k |y_k|^2 & \sum_k y_k \\ \sum_k y_k e^{-ikd} & \sum_k \overline{y_k} e^{-ikd} & \sum_k e^{-ikd} \end{pmatrix} \quad (42)$$

Substitution of equation 40 into equation 38 and comparing coefficients gives the following equations:

$$A_o p_o + B_o \overline{q_o} = K_o \quad (43)$$

$$A_o q_o + B_o \overline{p_o} = 0 \quad (44)$$

$$A_o r_k + B_o \overline{r_k} + C_o e^{ikd} = 0 \quad (45)$$

Solving equation s 43-45 simultaneously gives the following:

$$\begin{pmatrix} p_o \\ q_o \\ r_k \end{pmatrix} = \frac{1}{|A_o|^2 - |B_o|^2} \begin{pmatrix} K_o \overline{A_o} \\ -K_o B_o \\ B_o \overline{C_o} e^{-ikd} - \overline{A_o} C_o e^{ikd} \end{pmatrix} \quad (46)$$

Imposing the unity gain condition of equation 19 gives $K_o$ as:

$$K = \frac{||A_o|^2 - |B_o|^2|}{\sqrt{|A_o|^2 + |B_o|^2}} \quad (47)$$

The constant term, r, in equation 30 has been replaced by $r_k$ in equation 40 which from equation 46 may be a linear combination of two tones at sampled frequencies +d and −d $$r_k = v_o e^{ikd} + w_o e^{-ikd} \quad (48)$$

where $v_o$ and $w_o$ are constants given by:

$$\begin{pmatrix} v_o \\ w_o \end{pmatrix} = \frac{1}{|A_o|^2 - |B_o|^2} \begin{pmatrix} -\overline{A_o} C_o \\ B_o \overline{C_o} \end{pmatrix} \quad (49)$$

The correction equation 40 implemented by quadrature correction 101 may be re-written as:

$$y_k = \frac{p_o}{K} z_k + \frac{q_o}{K} \overline{z_k} + v_o e^{ikd} + w_o e^{-ikd} \quad (50)$$

Correction coefficient calculator 109 may calculate the coefficients $p_o$, $g_o$, $v_o$, and $w_o$ from equations 46, 47, 48 and 49.

FIG. 4 illustrates a process that adds the tones $v_o$, and $w_o$ to the correction. When the process of FIG. 4 operates in conjunction with the process shown in FIG. 2, the combined process provides an embodiment of quadrature correction 101 for an offset-LO. In some example embodiments, the frequency ratio d is a rational value multiplied by π.

On each clock cycle, the tone table 400 is read twice: 401 reads the index from 402 and passes the indexed value from the table 400 to multiplier 406. Multiplier 406 then multiplies the table entry by correction coefficient 405 which may represent $v_o$ in equation 50 and passes the result to adder 413.

404 reads the index from 403 and passes the indexed value from table 400 to multiplier 411. Multiplier 411 then multiplies the table entry by correction coefficient 412 which represents may $w_o$ in equation 50 and passes the result to adder 413. Adder 413 then adds the results from multiplier 406 and multiplier 411 and stores the result at 210.

Upon each clock cycle, the values of the table indices held in 402 and 403 are adjusted: 407 increments the value in 402 followed by 408 which reduces the value modulo T where T is the length of the table 400; 409 decrements the value in 403 followed by 410 which reduces the value modulo T where T is the length of the table 400.

Figure 5:
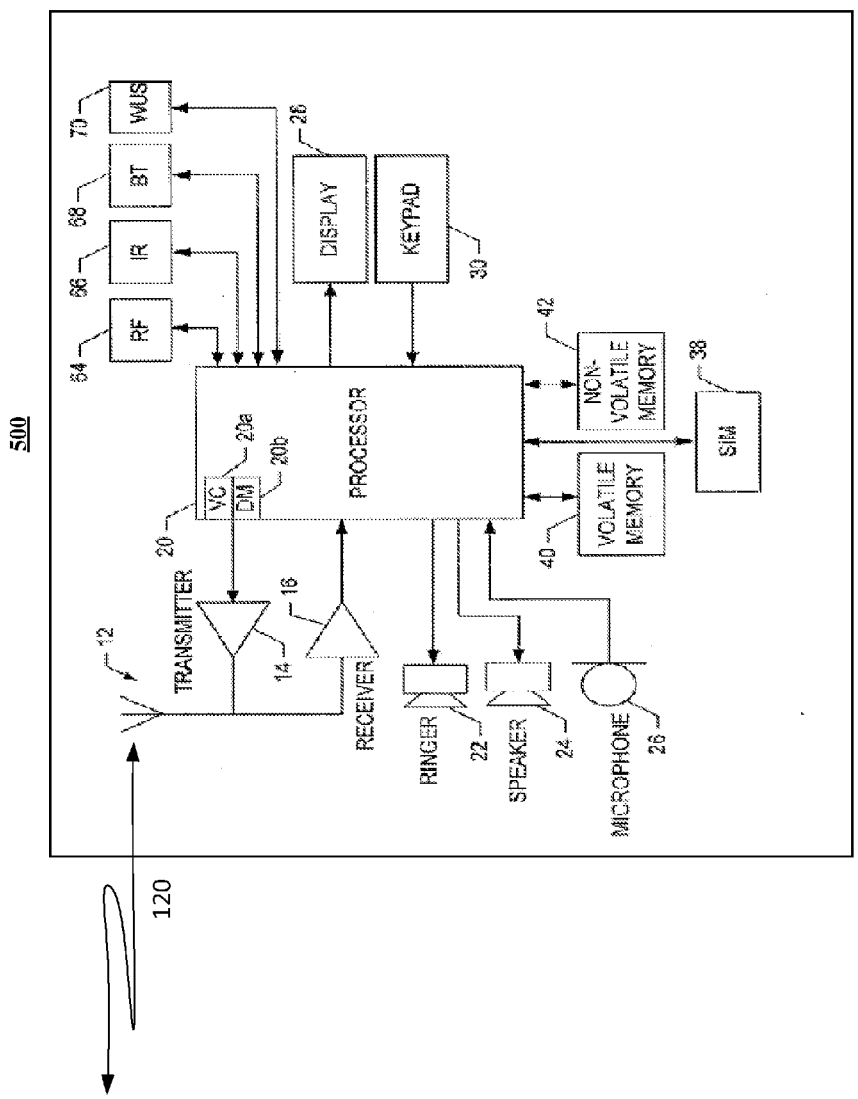
FIG. 5 depicts an example of an apparatus, in accordance with some example embodiments.

FIG. 5 depicts an apparatus 500, in accordance with some example embodiments. Apparatus 500 may be implemented in a remote radio head (RRH), base station, Node B, Enhanced Node B, user equipment, mobile station, mobile device, wireless modem, wired modem, access point, wireless router, or any other communications device. The apparatus 500 may include at least one antenna 12, a transmitter 14, and a receiver 16. Alternatively transmit and receive antennas may be separate. The apparatus 500 may also include a processor 20 configured to provide signals to and from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of another apparatus by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit ("ASIC"), a field programmable gate array ("FPGA"), and/or the like), or some combination thereof. Apparatus 500 may include a location processor and/or an interface to obtain location information, such as positioning and/or navigation information. Accordingly, although illustrated in FIG. 7 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network ("WLAN") techniques, such as, Institute of Electrical and Electronics Engineers ("IEEE") 802.11, 802.16, and/or the like. In addition, these signals may include speech data, user generated data, user requested data, and/or the like.

The apparatus 500 may be capable of operating with one or more air interface standards, communication protocols, modulation types, access types, and/or the like. For example, the apparatus 500 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem ("IMS") communication protocols (for example, session initiation protocol ("SIP") and/or the like. For example, the apparatus 500 may be capable of operating in accordance with 2G wireless communication protocols IS-136, Time Division Multiple Access ("TDMA"), Global System for Mobile communications ("GSM"), IS-95, Code Division Multiple Access ("CDMA"), and/or the like. In addition, for example, the apparatus 500 may be capable of operating in accordance with 2.5G wireless communication protocols General Packet Radio Service ("GPRS"), Enhanced Data GSM Environment ("EDGE"), and/or the like. Further, for example, the apparatus 500 may be capable of operating in accordance with 3G wireless communication protocols, such as, Universal Mobile Telecommunications System ("UMTS"), Code Division Multiple Access 2000 ("CDMA2000"), Wideband Code Division Multiple Access ("WCDMA"), Time Division-Synchronous Code Division Multiple Access ("TD-SCDMA"), and/or the like. The apparatus 500 may be additionally capable of operating in accordance with 3.9G wireless communication protocols, such as, Long Term Evolution ("LTE"), Evolved Universal Terrestrial Radio Access Network ("E-UTRAN"), and/or the like. Additionally, for example, the apparatus 500 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 500. For example, the processor 20 may comprise a digital signal processor device, a microprocessor device, an analog-to-digital converter, a digital-to-analog converter, and/or the like. Control and signal processing functions of the apparatus 500 may be allocated between these devices according to their respective capabilities. The processor 20 may additionally comprise an internal voice coder (VC) 20a, an internal data modem ("DM") 20b, and/or the like. Further, the processor 20 may include functionality to operate one or more software programs, which may be stored in memory. In general, processor 20 and stored software instructions may be configured to cause apparatus 500 to perform actions. For example, processor 20 may be capable of operating a connectivity program, such as, a web browser. The connectivity program may allow the apparatus 500 to transmit and receive web content, such as location-based content, according to a protocol, such as, wireless application protocol, WAP, hypertext transfer protocol, HTTP, and/or the like.

Apparatus 500 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 500 may include a battery for powering various circuits related to the mobile terminal, for example, a circuit to provide mechanical vibration as a detectable output. The user input interface may comprise devices allowing the apparatus 500 to receive data, such as, a keypad 30 (which can be a virtual keyboard presented on display 28 or an externally coupled keyboard) and/or other input devices.

Moreover, the apparatus 500 may include a short-range radio frequency ("RF") transceiver and/or interrogator 64, so data may be shared with and/or obtained from electronic devices in accordance with RF techniques. The apparatus 500 may include other short-range transceivers, such as an infrared ("IR") transceiver 66, a Bluetooth ("BT") transceiver 68 operating using Bluetooth wireless technology, a wireless universal serial bus ("USB") transceiver 70, and/or the like. The Bluetooth transceiver 68 may be capable of operating according to low power or ultra-low power Bluetooth technology, for example, Wibree, radio standards. In this regard, the apparatus 500 and, in particular, the short-range transceiver may be capable of transmitting data to and/or receiving data from electronic devices within proximity of the apparatus, such as within 10 meters. The apparatus 500 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 500 may comprise memory, such as, a subscriber identity module ("SIM") 38, a removable user identity module ("R-UIM"), and/or the like, which may store information elements related to a mobile subscriber. In addition to the SIM, the apparatus 500 may include other removable and/or fixed memory. The apparatus 500 may include volatile memory 40 and/or non-volatile memory 42. For example, volatile memory 40 may include Random Access Memory ("RAM") including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory ("NVRAM"), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of a user equipment/mobile terminal. The memories may comprise an identifier, such as an international mobile equipment identification ("IMEI") code, capable of uniquely identifying apparatus 500. The functions may include one or more of the operations disclosed herein with respect to FIGS. 2-4, and the like. In the example embodiment, the processor 20 may be configured using computer code stored at memory 40 and/or 42 to provide the operations disclosed with respect to the process shown in FIGS. 2-4 and the like.

Some of the embodiments disclosed herein may be implemented in software, hardware, application logic, or a combination of software, hardware, and application logic. The software, application logic, and/or hardware may reside in memory 40, the control apparatus 20, or electronic components disclosed herein, for example. In some example embodiments, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 1, 2, 3 and/or 4. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, the process of FIGS. 1-4, and the like).

The subject matter described herein may be embodied in systems, apparatus, methods, and/or articles depending on the desired configuration. For example, the systems, apparatus, methods, and/or articles described herein can be implemented using one or more of the following: electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although some of the examples described herein refer to the use of specific technologies, such as LTE, Wi-Fi, and the like, the subject matter described herein is not limited to those technologies, and, as such, can be used with other radio technologies as well.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed is:

1. A computer-implemented method, comprising:
   capturing intermediate data samples for transmission by a wireless communications transmitter;
   applying signal processing to the intermediate data samples;
   capturing output data samples after applying the signal processing;
   determining quadrature correction coefficients from the intermediate data samples and the output data samples, wherein the quadrature correction coefficients remove quadrature errors caused by the signal processing, wherein the determining quadrature correction coefficients comprises determining matrix values from at least the intermediate data samples and a frequency difference ratio; and
   applying the quadrature correction coefficients to a series of input data samples, wherein the intermediate data samples comprise the input data samples with the quadrature correction coefficients applied to the input data samples,
   wherein the capturing the intermediate data samples, the applying the signal processing, the capturing the output data samples, the determining the quadrature correction coefficients, and the applying the quadrature correction coefficients are performed by at least one processor.

2. The method of claim 1, wherein the signal processing includes amplification.

3. The method of claim 1, wherein the quadrature correction coefficients are averaged over time to produce average quadrature correction coefficients.

4. The method of claim 1, wherein the determining quadrature correction coefficients comprises:
   determining first vector values, wherein the first vector values are determined from the intermediate data samples and the output data samples; and
   determining second vector values representative of the quadrature errors caused by the signal processing.

5. The method of claim 4, wherein the quadrature errors ($A_0$, $B_0$, $C_0$) caused by the signal processing are expressed as:

$$\begin{pmatrix} A_o \\ B_o \\ C_o \end{pmatrix} = H_o^{-1} \begin{pmatrix} \sum_k z_k \overline{y_k} \\ \sum_k z_k y_k \\ \sum_k z_k e^{-ikd} \end{pmatrix},$$

wherein $z_k$ are the output samples corresponding to the intermediate samples $y_k$.

6. The method of claim 4, wherein the quadrature correction coefficients ($p_o$, $q_o$, $r_k$) are expressed as:

$$\begin{pmatrix} p_o \\ q_o \\ r_k \end{pmatrix} = \frac{1}{|A_o|^2 - |B_o|^2} \begin{pmatrix} K_o \overline{A_o} \\ -K_o B_o \\ B_o \overline{C_o} e^{-ikd} - \overline{A_o} C_o e^{ikd} \end{pmatrix},$$

and wherein $K_o$ is calculated as:

$$K = \frac{||A_o|^2 - |B_o|^2|}{\sqrt{|A_o|^2 + |B_o|^2}}.$$

7. The method of claim 1, wherein the matrix values are entries in $H_o$, wherein $H_o$ is expressed as:

$$H_o = \begin{pmatrix} \sum_k |y_k|^2 & \sum_k \overline{y_k}^2 & \sum_k \overline{y_k} \\ \sum_k y_k^2 & \sum_k |y_k|^2 & \sum_k y_k \\ \sum_k y_k e^{-ikd} & \sum_k \overline{y_k} e^{-ikd} & \sum_k e^{-ikd} \end{pmatrix},$$

wherein k is an index having values from a start of the intermediate data samples to an end of the intermediate data samples, and $y_k$ are the values of the corresponding intermediate samples.

8. The method of claim 1, wherein the frequency difference ratio comprises a ratio of a difference in frequency between a modulator local oscillator and a demodulation local oscillator to a feedback sampling rate.

9. A system comprising:
  at least one data processor;
  a memory storing instructions which, when executed by the at least one data processor, causes the at least one data processor to perform operations comprising:
    capturing intermediate data samples for transmission by a wireless communications transmitter;
    applying signal processing to the intermediate data samples;
    capturing output data samples after applying the signal processing;
    determining quadrature correction coefficients from the intermediate data samples and the output data samples, wherein the quadrature correction coefficients remove quadrature errors caused by the signal processing, wherein the determining quadrature correction coefficients comprises determining matrix values from at least the intermediate data samples and a frequency difference ratio; and
    applying the quadrature correction coefficients to a series of input data samples, wherein the intermediate data samples comprise the input data samples with the quadrature correction coefficients applied to the input data samples,
  wherein the capturing the intermediate data samples, the applying the signal processing, the capturing the output data samples, the determining the quadrature correction coefficients, and the applying the quadrature correction coefficients are performed by at least one processor.

10. The system of claim 9, wherein the signal processing includes amplification.

11. The system of claim 9, wherein the quadrature correction coefficients are averaged over time to produce average quadrature correction coefficients.

12. The system of claim 9, wherein the determining quadrature correction coefficients comprises:
  determining first vector values, wherein the first vector values are determined from the intermediate data samples and the output data samples; and
  determining second vector values representative of the quadrature errors caused by the signal processing.

13. The system of claim 12, wherein the quadrature errors ($A_0$, $B_0$, $C_0$) caused by the signal processing are expressed as:

$$\begin{pmatrix} A_o \\ B_o \\ C_o \end{pmatrix} = H_o^{-1} \begin{pmatrix} \sum_k z_k \overline{y_k} \\ \sum_k z_k y_k \\ \sum_k z_k e^{-ikd} \end{pmatrix},$$

wherein $z_k$ are the output samples corresponding to the intermediate samples $y_k$.

14. The system of claim 12, wherein the quadrature correction coefficients ($p_o$, $q_o$, $r_k$) are expressed as:

$$\begin{pmatrix} p_o \\ q_o \\ r_k \end{pmatrix} = \frac{1}{|A_o|^2 - |B_o|^2} \begin{pmatrix} K_o \overline{A_o} \\ -K_o B_o \\ B_o \overline{C_o} e^{-ikd} - \overline{A_o} C_o e^{ikd} \end{pmatrix},$$

and wherein $K_o$ is calculated as:

$$K = \frac{||A_o|^2 - |B_o|^2|}{\sqrt{|A_o|^2 + |B_o|^2}}.$$

15. The system of claim 9, wherein the matrix values are entries in $H_o$, wherein $H_o$ is expressed as:

$$H_o = \begin{pmatrix} \sum_k |y_k|^2 & \sum_k \overline{y_k}^2 & \sum_k \overline{y_k} \\ \sum_k y_k^2 & \sum_k |y_k|^2 & \sum_k y_k \\ \sum_k y_k e^{-ikd} & \sum_k \overline{y_k} e^{-ikd} & \sum_k e^{-ikd} \end{pmatrix},$$

wherein k is an index having values from a start of the intermediate data samples to an end of the intermediate data samples, and $y_k$ are the values of the corresponding intermediate samples.

16. A non-transitory computer program product storing instructions, which when executed by at least one data processor of at least one computing system, implement a method comprising:
  capturing intermediate data samples for transmission by a wireless communications transmitter;
  applying signal processing to the intermediate data samples;
  capturing output data samples after applying the signal processing;
  determining quadrature correction coefficients from the intermediate data samples and the output data samples, wherein the quadrature correction coefficients remove quadrature errors caused by the signal processing, wherein the determining quadrature correction coefficients comprises determining matrix values from at least the intermediate data samples and a frequency difference ratio; and
  applying the quadrature correction coefficients to a series of input data samples, wherein the intermediate data samples comprise the input data samples with the quadrature correction coefficients applied to the input data samples,
  wherein the capturing the intermediate data samples, the applying the signal processing, the capturing the output data samples, the determining the quadrature correction coefficients, and the applying the quadrature correction coefficients are performed by at least one processor.

17. The non-transitory computer program product of claim 16, wherein the signal processing includes amplification.

18. The non-transitory computer program product of claim 16, wherein the quadrature correction coefficients are averaged over time to produce average quadrature correction coefficients.

19. The non-transitory computer program product of claim 16, wherein the determining quadrature correction coefficients comprises:

determining first vector values, wherein the first vector values are determined from the intermediate data samples and the output data samples; and determining second vector values representative of the quadrature errors caused by the signal processing.

20. The non-transitory computer program product of claim 19, wherein the errors ($A_0$, $B_0$, $C_0$) caused by the signal processing are expressed as:

$$\begin{pmatrix} A_o \\ B_o \\ C_o \end{pmatrix} = H_o^{-1} \begin{pmatrix} \sum_k z_k \overline{y_k} \\ \sum_k z_k y_k \\ \sum_k z_k e^{-ikd} \end{pmatrix},$$

wherein $z_k$ are the output samples corresponding to the intermediate samples $y_k$.

21. The non-transitory computer program product of claim 19, wherein the quadrature correction coefficients ($p_o$, $q_o$, $r_k$) are expressed as:

$$\begin{pmatrix} p_o \\ q_o \\ r_k \end{pmatrix} = \frac{1}{|A_o|^2 - |B_o|^2} \begin{pmatrix} K_o \overline{A_o} \\ -K_o B_o \\ B_o \overline{C_o} e^{-ikd} - \overline{A_o} C_o e^{ikd} \end{pmatrix},$$

and wherein $K_o$ is calculated as:

$$K = \frac{||A_o|^2 - |B_o|^2|}{\sqrt{|A_o|^2 + |B_o|^2}}.$$

22. The non-transitory computer program product of claim 16, wherein the matrix values are entries in $H_o$, wherein $H_o$ is expressed as:

$$H_o = \begin{pmatrix} \sum_k |y_k|^2 & \sum_k \overline{y_k}^2 & \sum_k \overline{y_k} \\ \sum_k y_k^2 & \sum_k |y_k|^2 & \sum_k y_k \\ \sum_k y_k e^{-ikd} & \sum_k \overline{y_k} e^{-ikd} & \sum_k e^{-ikd} \end{pmatrix},$$

wherein k is an index having values from a start of the intermediate data samples to an end of the intermediate data samples, and $y_k$ are the values of the corresponding intermediate samples.

\* \* \* \* \*